Dec. 18, 1928.
W. H. DRAUGHON
CALENDAR
1,695,539
Filed Aug. 11, 1923
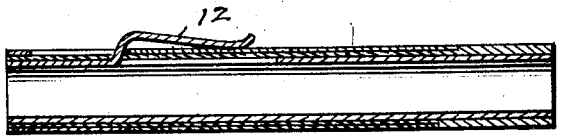
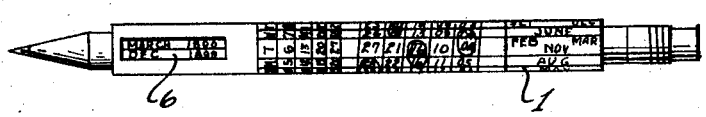
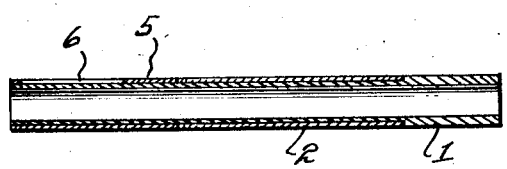
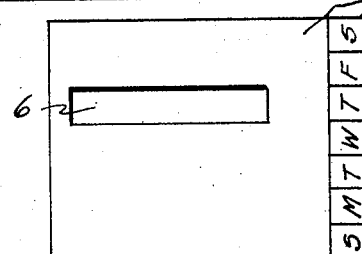
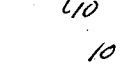
INVENTOR.
BY WILLIAM H. DRAUGHON
ATTORNEY.

Patented Dec. 18, 1928.

1,695,539

UNITED STATES PATENT OFFICE.

WILLIAM H. DRAUGHON, OF DETROIT, MICHIGAN.

CALENDAR.

Application filed August 11, 1923. Serial No. 656,840.

This invention relates to calendars, and the object thereof is to provide an efficient and inexpensive form of calendar adapted for use in designating the days of the week, month and year of a century or several centuries. A further object of the invention is to provide a calendar adapted to be applied to a pencil either fixed thereto or removable and having one or more parts rotatable relative to the other parts to enable the same to be read for the month, week and day of any particular year. Fundamentally, the object of the invention is to provide a calendar having a stationary and a movable part, one bearing indications for several months of the year and the other having numerals indicative of a number of years of a century and the usual numerals for the days of a month, said movable part also being movable relative to a portion having indications for the days of the week in such relation that, by setting the movable part to secure the necessary relationship of the year and month, the dates of the days of the weeks for said month are indicated. A further object of the invention is in the provision of means whereby the dates of the days of the week for any month of any year of several centuries may be determined.

There is a further feature of the invention in the arrangement of the months and years whereby the calendar may be set for the leap years of one or more centuries, and a further feature of the invention is in the arrangement of the calendar in a compact form indicating a number of years of a century in which there is change as to the dates of the days of the week in any month—that is, the first twenty-eight years of any century, the dates of the days of the week of any one month change from year to year subsequent to which the twenty-ninth year would be a repetition of the first year. By taking advantage of this fact, compactness in form is secured in that all of the years of a century or more than a century are not required to be given on a calendar. These and other objects and the several novel features of the invention are hereinafter more fully described and claimed, and the preferred form of a calendar embodying my invention is shown in the accompanying drawings in which—

Fig. 1 is a side elevation showing the calendar in tubular form as applied to a pencil and being of a type in which the dates of the days of the month for several centuries may be determined.

Fig. 2 is a sectional view of the cylindrical member forming the calendar which may be secured on a pencil.

Fig. 3 is a detail in plan view of a portion of the calendar in flat form bearing indications of the days of the week.

Fig. 4 is a view of what is hereinafter termed the stationary portion of the calendar in flat form whereby all the indications thereon are shown in their general relationship.

Fig. 5 is a similar view of the movable portion of the calendar also in flat form.

Fig. 6 is an elevation of a form of calendar adapted for determining the dates of the days of the month throughout a century.

Fig. 7 is a sectional view thereof.

Fig. 8 is a longitudinal section taken through the attaching clip.

While I have shown in Figs. 1, 2, 6 and 7 the preferred cylindrical form in which the calendar is made, it is to be understood that the calendar may have any desired form and that in its simplest form the invention involves a stationary and a movable member, one of the members bearing indications for a number of years of a century and the other bearing indication for the months of a year, both the month and year indications being arranged in seven spaces and adapted to be brought into alignment as hereinafter described. The movable member also bears the dates of the days of the month and in a relatively fixed member are the indications for the days of a week in seven spaces whereby, upon the setting of the movable member so that the desired year and month spaces are in registration, the dates of the days of the month are correctly positioned relative to the indication of the days of a week. This general arrangement is best designated in Figs. 3, 4 and 5 in a calendar adaptable for use through a number of centuries. This stationary part 1 has at one end seven spaces in each of which are the names of one or more months—April and July, September and December, November and March, January and October, are in pairs as these pairs of months in any year are repetitions as to the dates of the days of the week. Other spaces bear indications for the months of June, August and May. February is indicated in the November and March space, the dates of the days of the month being the same as November and March of each year except in leap year and for this reason February and January of these month indications are shown here as surrounded by a border line. Preferably, in practice these months are indicated in color differing from the color of the words indicating the remaining months of the year. Preferably, these indications of the month are at one end of the stationary part 1 and preferably the part 1 is made of paper, celluloid or other adaptable material. The part 2 of the calendar bears the indications for years 0 to 28 of a century, and it is to be noted that those numbers which are divisible by 4 are repeated in two consecutive spaces, each pair of such duplicate numbers being circumscribed or bound together by an oval that is, two years indicated by 04; two years indicated by 12, and two years indicated by 16, 20 and 28 which are the leap years and the first of these duplicated years is in color corresponding to that of February and January of the stationary part of the calendar. In the drawings, the colored indications are represented by "boxed-in" letters or figures. Thus, in a leap year, for instance the year 12 of any century, the space bearing the colored year is placed in alignment with the space bearing the January or February indication and the uncolored numerals 4, 8, 12 etc., in a succeeding year space are used with the uncolored months of the stationary part. This arrangement is necessary as the numeral of the days of January and February in a leap year remain unchanged by the added leap-year-day, while each of the remaining months begin one day later in the week. In the calendar as made for several centuries, the end of the part 1 opposite that bearing indications for the months of a year has indications for the years of several centuries arranged in seven spaces as indicated at 4 in Fig. 4. In this type the member 5 provided with a slot 6 therein covers this part 4, the century and months of a century being exposed to view through this slot. This member 5 also carries at one end indicated at 7, letters indicating the days of the week. Thus, by placing the member 5 over the part 4 of the member 1 for instance March 1900 to December 1999 would be indicated and this slot by such movement positions the indications for the days of the week in a certain relation to the months at the end 3 of the part 1. Thus, when the member 2 is set with the year in alignment with the month in which a date is desired, the dates of the days of the month are positioned relative to the indications for the days of the week. In the structure indicated in Fig. 6 for a single century the letters indicating the days of the week are on the member 8 at the end 9 while the months are at the end 10 of the member 8 and in the same relation as in Fig. 1. The member 11 is identical with the member 2 of Fig. 5 and is rotatable on this member 8.

As previously stated, this calendar may be made in any approved manner and of any adaptable material and preferably is made in cylindrical form for use on a pencil as heretofore stated. In the making of it in a cylindrical form, it may be made of paper and coated with a preparation such as collodion to prevent obliteration of the matter printed thereon or it may be made of celluloid. In the structure shown in Figs. 2 or 7, the member 2 or 11 is rotatable about the respective base mamber 1 or 8. To permit the member 11 to be placed on the member 8 in the form shown in Fig. 7, the part 9 is placed in position subsequent to the member 11 and is secured in place on the end of the part 8. In the form shown in Fig. 2, the member 5 is rotatable and therefore the two members 2 and 5 may be readily placed on the base member 1. This calendar may be made in several forms either as a permanent part of a pencil of such type as has removable leads or it may be made separately and a pencil inserted therein and may be made of paper and carry advertising matter. Also the paper could be secured on a thin metal tube as indicated in Fig. 8. This tube may have a struck up part 12 lying over the end of the calendar proper and providing a clip for retaining the device in the user's pocket as will be readily understood.

A feature of this calendar is in the arrangement of the numerals indicating the years as shown more clearly in Fig. 5—that is, each leap year has two spaces, for instance the years 04, 08, 12, 16, 20 and 28 of a century, and the member 2 is rotatable relative to the portion 3 of the member 1 and in use is turned in a direction opposite to that in which the numerals for the years advance. The first indication of a leap year, for instance 04, is in a color or otherwise made to correspond with the January and February of the portion 3 while the second occurrence of leap year 04 is in the same color as the years other than the leap years and likewise the same in color as the remaining months indicated on the portion 3. The reason for this arrangement arises in the following manner:—The dates of the days of the week for January and February of a leap year are the same as though there was no leap year but February of that year containing twenty-nine days, the remaining months begin one day later in the week and thus the calendar would be used for January or February of 1904 with the first 04 opposite the similarly colored January or February while the remainder of the months would require the advancing of the portion 2 one space and thus moving the dates of the month one space relative to the indications for the days of the week. It is believed new in a calendar to thus arrange the indications or numerals for a leap year in two adjacent spaces whereby a portion of the months of a leap year may be read relative to one of the spaces and the remainder of the months read relative to the next space which is the arrangement of the movable and stationary members herein described advances the dates relative to the days of the week.

The calendar repeats every twenty-eight years. Thus, if one wanted to know the date of the days of the month of April 1955, the space carrying the numeral 27 of the part 2 would be placed in alignment with the space marked April of the part 1 thereby positioning the month dates correctly relative to the days of the week. In the device shown in Figs. 4 and 5, the member 5 will be placed so that the year March to December 1900 to 1999 are exposed to view through the slot 6. This will position the days of the week properly relative to the numerals indicating the days of the month and a direct reading of all of the days for the month of April, 1955, will be given. In the case shown in Fig. 6 in which the indication of the days of the week are in fixed relation with the section 8, the member 11 will be turned in the same manner as above described relative to the member 2, positioning the section 8 with the desired year opposite the space indicating April and a direct reading of the days of the month relative to the days of the week is given.

The member 5 is used in the form shown in Fig. 1 to position the days of the week properly for the months of the several centuries and the indications for the several centuries at the end 4 of the member 1 are peculiarly arranged to compensate for the missing of one leap year in every one hundred years for three consecutive centuries and the restoration or preservation of the leap year in every fourth century—that is, the first indications are for January and February of 1700 but, due to its not being a leap year, March 1700 to December 1799 are in a succeeding section for the reason that after January and February of 1700 (which is not a leap year), the dates of the days of the week are not retarded one space as is usual to care for an added day of February. The year indications in my calendar are arranged as though every fourth year was a leap year and, due to the above mentioned fact that three of four centuries are not leap years, compensation must be provided in the calendar for this fact. Therefore, in the century indications shown at 4 in Fig. 4, three of the century indications are each divided into two periods, the fourth century being in a single period which is a leap year century. Therefore, in operation and to compensate for the omission of the usual leap year day in February of 1700, 1800 and 1900 in the arrangement of the calendar showing indication of the days of the week after February must be set forward one space for all remaining months of the century in order that movement of one of the members to position the year indications relative to the month indication will position the dates of the days of the month correctly for those centuries in which the one hundredth year is not a leap year.

From the foregoing description it is evident that the principle involved in the calendar may be embodied in various forms thereof specifically the arrangement of one member movable relative to another to position the dates of the days of the month relative to the days of the week giving a proper reading for the month and year. It is further to be noted that, while I have shown in Fig. 5 for instance the month indications at 3 on the member 1, the month indications arranged in seven spaces may be placed upon the member 2 and the year indications placed upon the member 1 without changing their sequence (but reversing the order of progression) and resulting in the same accuracy of reading as in the arrangement specifically shown. Preferably, the calendar is made in cylindrical form in any approved manner adapting the same to be used with an ordinary pencil or other holder of similar form. This secures a compact form of calendar always useful and generally at hand when required as it can be carried in the pocket with the pencil and, by making it removable, it can be sold separately or even given away with advertising matter and can be made up in an inexpensive way. A more permanent structure can be made by utilizing the celluloid or a thin metal tube to carry and support the calendar parts.

Having thus fully described my invention, what I claim and desire to secure by Letters Patent of the United States is—

1. In a calendar, a pair of cylindrical members in relatively rotatable relation, one of the said members bearing monthly indications arranged in seven consecutive spaces and the other of the said members having a like series of spaces aligned longitudinally thereof and at one end bearing the days of a month and week in consecutive order in said spaces and at the other end having a series of year indications arranged in consecutive order in the said spaces, the indications for the leap years of a century being in duplicate and occurring in adjacent spaces one of which is a different color from the other, the January and February month indications being also in a color distinguishing from the remainder of the month indications, and means in addition to the said difference in color of the leap year indications for indicating to the user that the said duplicate numbers both indicate a leap year.

2. In a calendar, a pair of cylindrical members in relative rotatable relation, one of the members bearing month indications arranged in seven consecutive spaces and the other of the said members having a like series of spaces aligned longitudinally thereof and at one end bearing indications of the days of the month and week in consecutive order and at the other end having a series of year indications arranged in consecutive order in the said spaces, the indications for the leap years of a century being in duplicate and occurring in adjacent spaces one of which is of a color different from the other, the January and February month indications being also of the same color as the differing leap year indication, and means consisting of a mark of the same color as the January and February month indications coupling the two leap year indications and providing an indication to the user, when a January or February month indication is positioned in alignment with a leap year indication of another color, that the calendar should be arranged to position the January or February month indication as the case may be in alignment with the leap year indication of the same color.

In testimony whereof, I sign this specification.

WILLIAM H. DRAUGHON.